United States Patent
Lamb

[15] 3,677,383
[45] July 18, 1972

[54] PART METER
[72] Inventor: Donald P. Lamb, Ann Arbor, Mich.
[73] Assignee: La Salle Machine Tool, Inc., Warren, Mich.
[22] Filed: Nov. 20, 1970
[21] Appl. No.: 91,271

[52] U.S. Cl. .............................. 193/35 A, 198/26, 221/297
[51] Int. Cl. .............................. B65g 13/00, B65g 47/29
[58] Field of Search .................. 193/35 R, 35 A, 35 G, 36; 198/22, 26, 34; 221/251, 272, 274, 295, 301, 297

[56] References Cited

UNITED STATES PATENTS

| | | | |
|---|---|---|---|
| 1,508,369 | 9/1924 | Johnson | 198/26 |
| 3,307,741 | 3/1967 | Kovacevic | 221/301 X |
| 2,693,898 | 11/1954 | Epperson | 221/295 |
| 1,384,193 | 7/1921 | Hinchman | 198/26 |

FOREIGN PATENTS OR APPLICATIONS

| | | | |
|---|---|---|---|
| 1,092,384 | 11/1960 | Germany | 243/39 |

*Primary Examiner*—Richard E. Aegerter
*Assistant Examiner*—W. Scott Carson
*Attorney*—Olsen & Stephenson

[57] ABSTRACT

A meter for use in a conveyor system for parts in which the parts flow in one direction along a track and it is desired to interrupt the flow of parts at one point in their travel along the track and eject the parts singly from that point. The part meter comprises a pair of generally cylindrical body members which are substantially parallel and are mounted for rotatable movement. The body members are provided with grooved portions located adjacent the track and capable of engaging a part so as to interrupt its flow and also of forming a path through the meter through which a single interrupted part can flow. A fluid actuated cylinder assembly is operable to concurrently rotate the body members between positions in which they interrupt parts and provide the desired path through the meter.

2 Claims, 5 Drawing Figures

Patented July 18, 1972

INVENTOR
DONALD P. LAMB

BY

*OLSEN & STEPHENSON*

ATTORNEYS

INVENTOR
DONALD P. LAMB

BY

OLSEN & STEPHENSON
ATTORNEYS

PART METER

BACKGROUND OF THE INVENTION

Automated machine tool systems require the movement of large numbers of the parts that are being finished in the system between work stations and storage containers in the system. It is a requirement in such a system that at certain points in the travel of the parts, the parts be fed singly to the next work station or storage container. A part meter performs this function at such points. In cases where the parts are relatively small, the principal requirement of the part meter is that it be provided in a compact, readily installable package which is capable of operation with parts flowing in either direction on the track with which the part meter is associated. It is an object of the present invention, therefore, to provide an improved part meter having these desired characteristics.

SUMMARY OF THE INVENTION

The part meter of this invention consists of a pair of generally cylindrical body members which are rotatably supported in suitable bearings on a frame for rotation about substantially parallel axes extending laterally of the track on which the parts are supported. The body members are provided with grooved lower portions which, in one position of the body members, are engageable with parts on the track so as to interrupt movement of the parts at the part meter. When the body members are rotated toward a second position of the body members, the grooves cooperate to define a path through which the part can flow past the part meter. Upper portions of the body members are notched and a projecting drive member on a cylinder actuated piston rod extends into the notches so that when the piston rod is reciprocated, the body members are rotated concurrently between the above defined first and second positions. The resultant package consisting of a frame, body members rotatably supported thereon, and an actuating cylinder assembly is readily installable on a track for the parts so as to perform the desired single part metering function. The body members are substantially symmetrical with respect to a plane extending transversely of the track so that the part meter can be operated in connection with parts flowing in either direction on the track.

Further objects, features and advantages of this invention will become apparent from a consideration of the following description, the appended claims, and the accompanying drawing in which:

Figure 1:
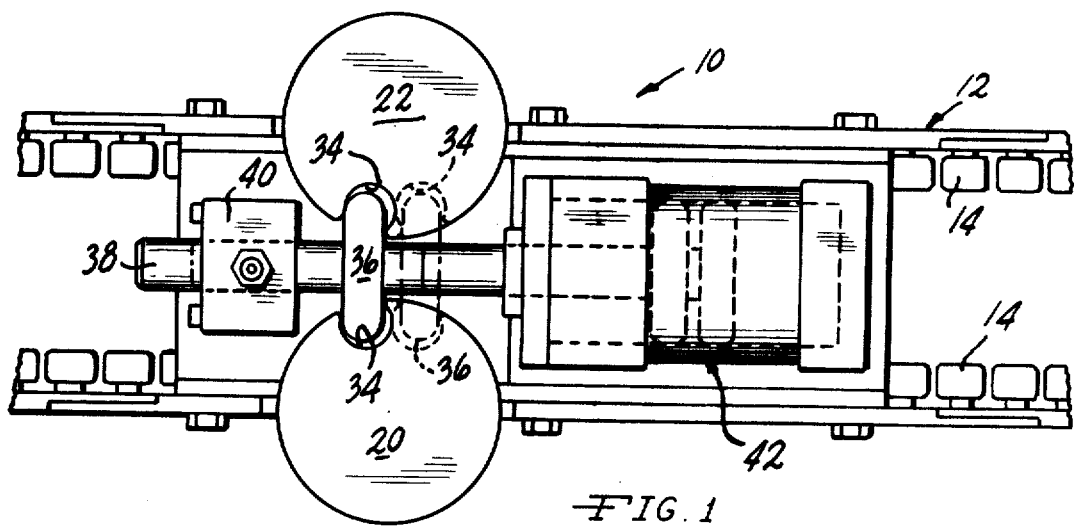
FIG. 1 is a top view of the part meter of this invention shown mounted on a track.
Figure 2:
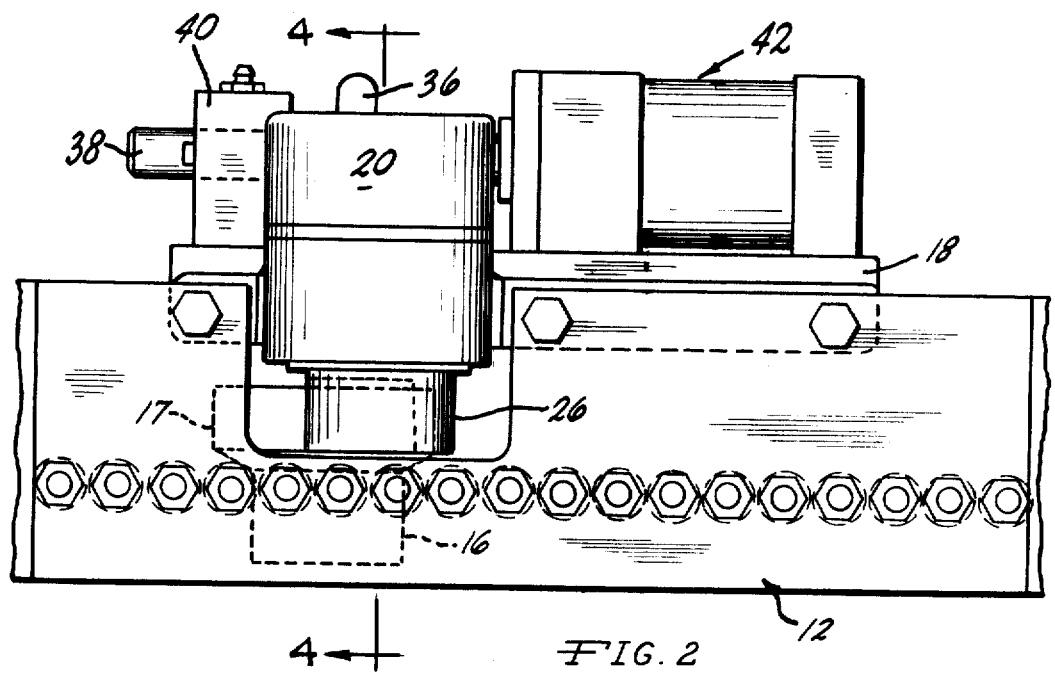
FIG. 2 is a side elevational view of the part meter of this invention shown in assembly relation with the track and in a position interrupting the flow of a part on the track.
Figure 3:
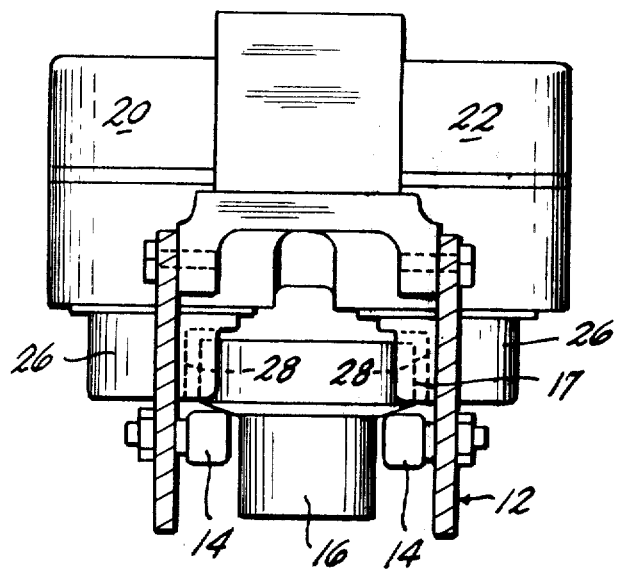
FIG. 3 is an end view of the part meter of this invention showing the supporting track therefor in cross section and showing a part in an interrupted position at the part meter.

With reference to the drawing, the part meter of this invention, indicated generally at 10, is illustrated in FIG. 1 mounted on a track 12 which includes rollers 14 for supporting workpieces 16 for flow longitudinally of the track 12. The part meter 10 consists of a frame 18 mounted on the track 12 and disposed in a supporting relation with a pair of generally cylindrical body members 20 and 22. The body members 20 and 22 are supported in bearings 24 for rotatable movement about substantially upright parallel axes extending laterally of the frame 12. The body members 20 and 22 have lower portions 26 positioned adjacent the track 12 for engagement with the cylindrical portion 17 of a workpiece 16 thereon so as to block movement of the workpiece 16 at the part meter 10.

Figures 4, 5:
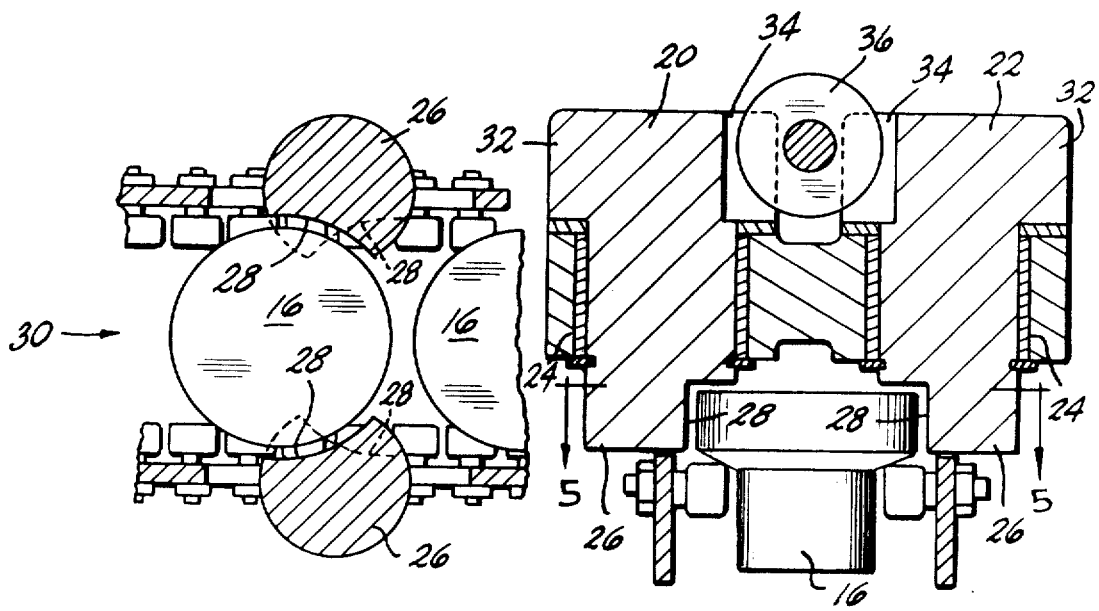
FIG. 4 is a transverse sectional view of the part meter of this invention as seen from substantially the line 4—4 in FIG. 2.
FIG. 5 is a horizontal sectional view of a portion of the part meter of this invention as seen from substantially the line 5—5 in FIG. 4.

As shown in FIG. 5, the body member portions 26 are provided with grooves 28 of arcuate shape and of a size to accommodate the cylindrical portion 17 of the part 16 therebetween. The body members 20 and 22 are movable to first positions shown in solid lines in FIG. 5 in which the portions 26 will engage the part 16 so as to prevent its flow past the part meter 10. The body members 20 and 22 are also movable to second positions shown in broken lines in FIG. 5 and during such movement, the grooves 28 cooperate to define a path between the body members 20 and 22 through which the part 16 can flow so that it can travel past part meter 10. During movement of the body members 20 and 22 to the second position, the body member portions 26 block the movement of the next successive part 16 in a line of parts on the track 12 past the part meter 10. In the illustrated embodiment of the invention, the parts 16 would be moving in the direction of the arrow 30 in FIG. 5. However, it can readily be appreciated that the body members 20 and 22 can be rotated in a reverse direction in the event it is desired to mount the part meter 10 on a track 12 in which the parts are moving in a direction opposite to the arrow 30.

The body members 20 and 22 have upper portions 32 which are provided with arcuate facing notches 34 which are substantially aligned in a direction transversely of the track 14. A driver head 36 (FIGS. 1 and 4) projects into the notches 34 and is mounted in a fixed position on a piston rod 38 supported in a guide 40 carried by the frame 18. The piston rod 38 forms a part of a fluid actuated cylinder assembly 42 which is capable of reciprocating the piston rod 38 so as to move the driver head 36 between the solid and broken line positions shown in FIG. 1 to provide for a corresponding movement of the body member portions 26 between the solid and broken line positions shown in FIG. 5.

In the operation of the part meter 10, assume that the body members 20 and 22 are in the positions shown in solid lines in FIG. 5 in which they block movement of the workpiece 16 in the direction of the arrow 30. The cylinder assembly 42 is actuated to retract the piston rod 38 so as to move the driver head 36 to the broken line position shown in FIG. 1 causing a corresponding movement of the body members 20 and 22 to the broken line position shown in FIG. 5. During such movement, a path is provided between the body members 20 and 22 through which the part 16 can move under the force of gravity or some other moving force in the direction of the arrow 30 past the part meter 10. When the body members 20 and 22 are in the broken line position shown in FIG. 5, they block movement of the next successive part 16 past the part meter 10. The cylinder assembly 42 is then actuated to extend the piston rod 38 to return the body members 20 and 22 to their solid line position shown in FIG. 5 in which the part meter 10 is in position for repeating the above-described cycle.

From the above description it is seen that this invention provides a compact package consisting of the frame 18, the body members 20 and 22 and the cylinder assembly 42 which is capable of ready installation with a track 12 so as to meter parts 16 thereon. By virtue of the compact nature of the part meter 10, it is readily manufactured at economical cost and is capable of installation in a variety of locations.

What is claimed is:

1. In a conveyor system for parts which includes track means for supporting a line of parts for flow in one direction, a part meter for interrupting the flow of parts at one point in said track means and for ejecting parts singly therefrom in said direction, said meter comprising a pair of side-by-side transversely spaced body members, said body members being substantially cylindrical in shape and being mounted for rotatable movement about substantially parallel axes extending laterally of said track means, said body members having lower portions disposed adjacent said track means and positioned to engage a part thereon in a first position of said body members so as to interrupt the flow of parts on said track means, said lower portions having grooves formed therein, said body members being rotatable from said first position to a second position during which said grooves cooperate to provide a path through which said part can flow in said one direction, said body members having upper portions provided with facing notches which are substantially aligned in a direction transversely of said track means, and a unit movable longitudinally of said track means and extending into said notches so that in response to translatory movement of said unit longitudinally of said track means said body members are rotated.

2. The structure according to claim 1 wherein said unit is a piston rod and further including a fluid actuated cylinder assembly for moving said piston rod.

* * * * *